US006810183B2

(12) United States Patent
Marion

(10) Patent No.: US 6,810,183 B2
(45) Date of Patent: Oct. 26, 2004

(54) METHOD AND DEVICE FOR PASSIVE ALIGNMENT OF OPTICAL FIBERS AND COMPONENTS, USING CROSS-SHAPED NOTCHES

(75) Inventor: Fancois Marion, Saint Egreve (FR)

(73) Assignee: Commissariat a l'Energie Atomique, Paris (FR)

( * ) Notice: Subject to any disclaimer, the term of this patent is extended or adjusted under 35 U.S.C. 154(b) by 271 days.

(21) Appl. No.: 10/181,520

(22) PCT Filed: Dec. 6, 2001

(86) PCT No.: PCT/FR01/03858

§ 371 (c)(1),
(2), (4) Date: Jul. 19, 2002

(87) PCT Pub. No.: WO02/46818

PCT Pub. Date: Jun. 13, 2002

(65) Prior Publication Data

US 2003/0001115 A1 Jan. 2, 2003

(30) Foreign Application Priority Data

Dec. 7, 2000 (FR) .............................. 00 15897

(51) Int. Cl.[7] .............................. G02B 6/26; G02B 6/36
(52) U.S. Cl. .............................. 385/52; 385/49; 385/88; 385/89
(58) Field of Search .......................... 385/49–52, 88–94

(56) References Cited

U.S. PATENT DOCUMENTS 5,434,939 A     7/1995   Matsuda 5,574,285 A     11/1996   Marion et al.
5,774,616 A     6/1998   Matsuda
6,309,113 B1 * 10/2001   Naito .......................... 385/88

FOREIGN PATENT DOCUMENTS

EP     0 305 112 A2    3/1989

OTHER PUBLICATIONS

Adrian Keating, Alexis Black, Adil Karim, Yi–Jen Chiu, Patrick Abraham, Chris Harder, Evelyn Hu and John Bowers, "6 Gbit/s Optically pumped 1.55 µm VCSEL Operating up to 105° C", Department of Electrical and Computer Engineering, University of California, 2 pages.

Yasuhiro Kobayashi, Kenichi Matsuda, Toyoji Chino, Takayuki Yoshida and Kenzo Hatada, "Improvement of Coupling Efficiency for Passive Alignment of Stacked Multi fiber Tapes to a Vertical–Cavity Surface–Emitting Laser Array", Mar. 1997, pp. 1872–1875.

* cited by examiner

Primary Examiner—Hemang Sanghavi
(74) Attorney, Agent, or Firm—Pearne & Gordon LLP

(57) ABSTRACT

Method and device for the passive alignment of optic fibers and components, using slots.

Given a component, in particular an opto-electronic component (2), that has to be coupled to at least one optic fiber (32, 34, 36), crossed slots are formed in the substrate (4) of the component in order to define, at the intersection of two slots, a housing (22, 24, 26) designed to receive one end of the fiber.

14 Claims, 3 Drawing Sheets

METHOD AND DEVICE FOR PASSIVE ALIGNMENT OF OPTICAL FIBERS AND COMPONENTS, USING CROSS-SHAPED NOTCHES

DESCRIPTION

TECHNICAL FIELD

The present invention concerns a method and a device for passively aligning at least one optic fibre and at least one component.

The component may be, as will be more clearly seen hereafter, an auxiliary alignment support for optic fibres or an opto-electronic component and, in this latter case, may be a photo-detector or a photo-emitter (for example, a diode or laser type).

In particular, the invention makes it possible to assemble a standard optic fibre tape and an array of emitting or receiving optical circuits.

The invention also concerns the connection of a matrix of optic fibres to a VCSEL matrix, in other words, vertical cavity surface emitting lasers, or a matrix of photo-detectors of this type.

Moreover, the invention relates to opto-electronic components that one wishes to assemble to high capacity optical links (for example, optic cables fitted with connectors) as well as the assembly of "parallel" optic fibres and juxtaposed opto-electronic components.

The invention also makes it possible to form direct optical connections between light emitters and other light emitters intended for the optical pumping of the former emitters.

STATE OF THE PRIOR ART

The coupling of an optic fibre and a laser beam emitter requires a precise alignment of this component and the fibre, in general an alignment to an accuracy of around 10 $\mu$m, the required precision being even greater in the case of monomode optic fibres. For the coupling of an optic fibre and a detection component (for example a VCSEL used as a photo-detector) the same accuracy is needed as for the coupling between the fibre and the emitter component.

If one considers the example of the coupling of an optic fibre and a laser emitter, a widely used alignment technique is the active alignment of the fibre and this laser emitter, wherein a voltage is applied to this emitter in order to emit a laser beam. When the alignment is obtained, the fibre is fixed to the laser emitter by welding or bonding.

This active alignment technique leads to high costs for the assembly obtained thereof.

For this reason, a passive alignment technique has been sought. In this case, the relative positioning then the fixing of the fibre and the emitting or receiving element are carried out without voltage being applied (for the element) nor luminous flux. The fibre and the element are mechanically wedged against each other and then fixed in a precise manner.

For example, a passive assembly technique for an optical fibre and a laser rod, whose emission is lateral, has been described. This assembly uses a support comprising a V groove, which is provided for the positioning of the optic fibre. This optic fibre is stuck in this V groove and the laser rod is hybrided with precision onto the support, opposite the fibre.

This technique enables an accuracy of around 1 $\mu$m to 5 $\mu$m to be obtained. It enables an optic fibre and a lateral emission laser to be assembled but it does not enable the assembly of a fibre and a VCSEL type laser, which emits light via one face.

Nevertheless, this technique has been modified in order to allow this type of assembly. In this case, optical or mechanical means are used to place the VCSEL at 90° to the optic fibre.

However, this modified passive alignment technique requires the use of complex means, in particular auxiliary alignment means.

In fact, if one wants to assemble an array of VCSEL (emitters or detectors) to optic fibres, the prior art shows that it is necessary to use an auxiliary alignment means and a support for the assembly.

A "direct" assembly of a VCSEL emitting via the rear face and an optic fibre is however described in the following documents:

(1) A. Keating et al., 6 Gbit/s optically pumped 1.55 $\mu$m VCSEL operating up to 105 ° C., Revue Photonics, vol. 12, n° 2, 2000, pp. 116–118.

(2) Y. Kobayashi et al., Improvement of coupling efficiency for passive alignment of stacked multifiber tapes to a vertical-cavity surface-emitting laser array, Jpn. J. Appl. Phys., vol. 36, Part I, n° 3B, 1997, pp. 1872–1875.

This known assembly is obtained by forming a guiding hole in the substrate of the VCSEL.

In the invention, as in the prior art, one seeks to resolve the problem of the direct and precise coupling between at least one optic fibre and at least one opto-electronic component (emitter or detector), such as, for example, a "planar" type, this coupling being passive.

In order to be clearer, let us consider the specific problem posed by the direct and precise assembly of a VCSEL and an optic fibre.

Document (1) describes how optic fibres and opto-electronic devices (VCSEL) may be passively aligned by boring guiding holes in the substrate that bears the devices and by sliding the optic fibres into these holes.

This known technique has however the disadvantage of requiring the formation of guiding holes directly in the substrate where the devices are built up.

However, it involves a substrate made out of GaAs and therefore fragile, which risks breaking during the manufacture of the devices if it is drilled beforehand, or which risks breaking during the final manufacturing operations of the assembly if this substrate is bored after the manufacture of the devices.

Moreover, this substrate in GaAs, rendered fragile by the holes, may break during the introduction of the optic fibres.

In addition, the boring of precise dimensions in a material such as GaAs is a little known technique and therefore difficult to implement.

DESCRIPTION OF THE INVENTION

An aim of the present invention is to resolve the aforementioned disadvantages.

The invention proposes forming at least one housing, comprising an alignment guide, directly on a component, in such a way that one is able to align an optic fibre and the component without a support or an auxiliary alignment wedge.

In a specific embodiment of the invention, where one wishes to connect optic fibres to one or several opto-electronic chips, the invention proposes forming alignment guides in the substrate of each chip, after hybriding this chip (or chips) onto the control circuit of this (these) chip(s).

For the formation of the alignment guides and the positioning of the fibres, the chip—control circuit assembly is more resistant than the chips on their own.

More precisely, an aim of the present invention is a method for passively aligning at least one component and at least one optic fibre, wherein the component comprises a substrate that has first and second faces opposite each other, this method being characterised in that:

- at least two slots are formed in the substrate, starting from the first face of this substrate, wherein these two slots form a cross and define, at their intersection, a housing that is provided to receive one end of the optic fibre, and
- this end is placed in the housing.

According to a first embodiment of the method according to the invention, the component is an opto-electronic component comprising at least one active zone formed on the side of the second face of the substrate, where this active zone is intended to emit or capture light and must be optically coupled to the optic fibre, and the slots are formed in such a way that the housing is positioned opposite the active zone of the opto-electronic component.

This opto-electronic component comprises, for example, at least one vertical cavity surface emitting laser, formed by the active zone.

According to a second specific embodiment, the component is an auxiliary alignment support for optic fibre(s).

According to a specific embodiment of the invention, this auxiliary alignment support is coupled to an opto-electronic component comprising at least one active zone, wherein the housing of the auxiliary alignment support is formed in such a way as to be positioned opposite this active zone when the auxiliary alignment support is coupled to the opto-electronic component.

In this case, the end of the optic fibre may be placed in the housing before, or after, the coupling of the auxiliary alignment support to the opto-electronic component.

In an example of the invention, several copies of the component (in particular when it involves an auxiliary alignment support) are formed, on a same substrate, then slots for each of these copies are formed and these copies are then separated from each other.

According to a specific embodiment of the method according to the invention, in the case where the component is an opto-electronic component, several copies of this opto-electronic component are formed on a same substrate, then slots for each of these copies are formed, then these copies are separated from each other, they are hybrided, on the side of their second faces, to an electronic control circuit and the respective optic fibre ends are placed in the housings formed on the copies, wherein these housings are provided to receive these ends.

However, according to a preferred embodiment, several copies of the opto-electronic component are formed on a same substrate, these copies are separated from each other, they are hybrided, on the side of their second faces, to an electronic control circuit and then slots are formed for all of the copies thus hybrided and the respective optic fibre ends are placed in the housings formed on the copies, wherein these housings are provided to receive these ends.

In the invention, the substrate may be transparent to the light intended to be captured or emitted by the optic fibre or, on the contrary, may be opaque to this light.

In this latter case, a hole, provided to open out the housing into the second face of the substrate, is in addition formed (before or after the slots).

This hole may be formed using a laser.

In the invention, the slots are, for their part, preferably formed using a cutting machine comprising a circular saw.

Another aim of the present invention is a device for passively aligning at least one component and at least one optic fibre, the component comprising a substrate that has first and second opposite faces, wherein this device is characterised in that it comprises at least two slots formed in the substrate leading from the first face of the substrate, wherein these two slots form a cross and define, by their intersection, a housing that is provided to receive one end of the optic fibre.

According to a specific embodiment of the device according to the invention, the component is an opto-electronic component that is hybrided, on the side of the second face of the substrate, to an electronic control circuit.

BRIEF DESCRIPTION OF THE DRAWINGS

The present invention will be better understood on reading the description of the embodiments that follow, which is given for purely illustrative purposes and is in nowise limitative, and by referring to the attached drawings, in which.

DETAILED DESCRIPTION OF SPECIFIC EMBODIMENTS

Figure 1A:
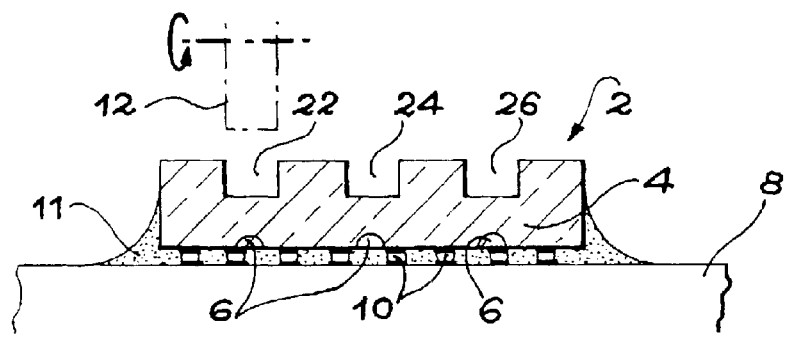
FIG. 1A is a schematic cross-sectional view of a specific embodiment of the device according to the invention during manufacture, using a substrate that is transparent to the light emitted or captured by the optic fibres intended to be coupled to this device.

The device according to the invention, which is schematically represented in FIG. 1A, comprises an opto-electronic component 2. This opto-electronic component comprises a substrate 4 as well as one or several active zones, such as the active zones 6, which are formed in the substrate 4, from one face of this substrate, and are each intended to emit or detect light. The substrate 4 is transparent to this light.

It should be pointed out that the active zones 6 emit light towards the face opposite to the one from which these active zones 8 have been formed, or detect light coming from this opposite face.

This latter face is called the "rear face" or the "upper face", whereas the face from which are formed the active zones 6 is called the "forward face" or the "lower face".

The opto-electronic component 2 is assembled, through its lower face, on a control circuit 8, using solder balls 10, then coated with resin (reference 11).

Such an assembly may be obtained, in several copies, by collectively hybriding then coating, using the resin, the opto-electronic components of the type of component 2, on a whole sheet of silicon comprising control circuits for all of these components.

In this respect, the reader should refer to the following document:

(3) U.S. Pat. No. 5,574,285 A (F. Marion, A. Guiga, M. Boitel and G. Gaude), "Electromagnetic radiation detector and its production process", corresponding to French patent application n° 94 00115 of the $7^{th}$ Jan. 1994.

In the example in FIG. 1A, one wishes to align the optic fibres or, more precisely, the cores of these fibres with the active zones 6 that constitute, for example, VCSEL type planar light emitters.

In accordance with the invention, housings for the fibres are formed on the upper face of the substrate 4 of the opto-electronic component 2 (or each opto-electronic component if several components have been hybrided to the control circuit).

To obtain these housings, slots or grooves are formed on the substrate 4.

To do this, one only has to use a simple cutting machine comprising a saw, the circular blade 12 of which can be seen in FIG. 1A.

Figure 1B:
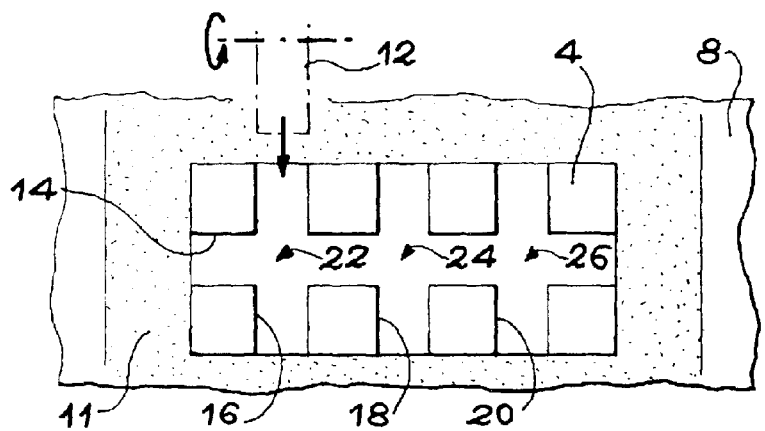
FIG. 1B is a schematic top view of the device in FIG. 1A.

More precisely, using this machine, crossed slots are formed in the substrate, from the upper face of this substrate, as may be seen in FIG. 1B.

In the example shown, a fist slot 14 is formed, which passes above three active zones, and three other slots 16, 18 and 20 that pass respectively above these three active zones, are perpendicular to this slot 14 and thus form three crosses with this slot 14.

Through their three intersections, the slots 14, 16, 18 and 20 define three housings 22, 24 and 26 that stretch out along the substrate 4, perpendicular to the upper face of this substrate 4, and are respectively positioned opposite the active zones.

Each housing substantially forms a prism with a square base (see FIGS. 1A and 1B). The axis X (FIG. 1D) of this housing is perpendicular to the upper face of the substrate 4, contains the intersection of the diagonals of this square and meets the corresponding active zone.

It should be pointed out that, when all of the opto-electronic components are hybrided onto the silicon sheet mentioned above, these components are positioned to an accuracy greater than 1 $\mu$m, as known to the prior art. All that needs to be done then is to form precise slots, aligned on the alignment marks formed beforehand on the surface of the control circuit, so that these slots are also aligned in relation to the active zones of the opto-electronic components hybrided onto this surface.

Each housing is intended to receive the end of an optic fibre in order to optically couple this fibre to the active zone corresponding to this housing.

Figure 1C:
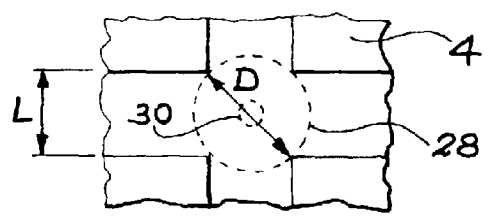
FIG. 1C is a magnified schematic top view of part of the device in FIG. 1A, showing a housing that has been formed in the substrate.

In the substrate of each opto-electronic component, slots are formed in a precise manner, with a pre-determined width L (FIG. 1C), in such a way that the distance between two opposite corners, at each intersection of two slots, is very slightly greater than the diameter D of the optic fibre 28 that one wishes to insert in the housing formed by this intersection, as can be seen in FIG. 1C, where the reference 30 represents the core of the fibre.

One therefore chooses a width L very slightly greater than $D/\sqrt{2}$ with, preferably, $D-L\sqrt{2} \leq 2$ $\mu$m.

Figure 1D:
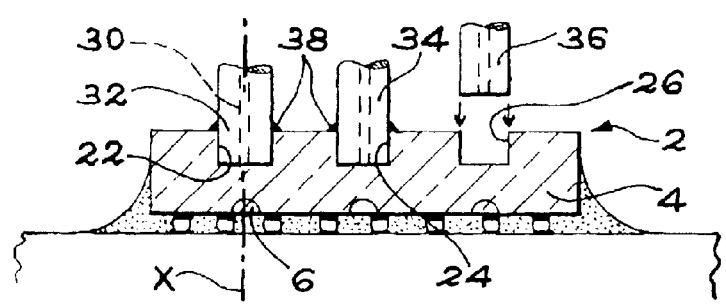
FIG. 1D is a schematic cross-sectional view of the device in FIG. 1A, in which the optic fibres are coupled to the active zones contained in the device.

FIG. 1D shows optic fibres 32, 34 and 36 whose ends are respectively introduced (or are being introduced) into the housings 22, 24 and 26, in order to be optically coupled to the active zones corresponding to these housings.

The axis X of each housing then coincides substantially with the axis of the core 30 of the end of the corresponding fibre.

A layer of adhesive 38, positioned at the periphery of each fibre, enables the end of this fibre to be maintained in the corresponding housing.

We will now give, in a purely indicative and in nowise limitative manner, an example corresponding to FIGS. 1A to 1D.

In this example, a 200 mm diameter silicon sheet is used to give control circuits of 5 mm×5 mm, where each of these circuits are intended to control a detection circuit.

Around one thousand AsGa detection circuits are hybrided onto this sheet, which are then coated with resin according to the technique called "underfill".

Each detection circuit comprises ten VCSEL separated from each other by 250 $\mu$m and constitutes, after hybriding, an opto-electronic circuit of 1 mm×3 mm.

The surface of gallium arsenide, which overruns the resin to a depth of around 200 $\mu$m, is notched with a saw whose blade has a width L of 90 $\mu$m and in such a manner that the intersections of the slots formed (which are horizontal and vertical from the top view) are opposite the VCSEL.

The alignment is made, as we have seen, on the marks formed on the silicon.

The distance D between two opposite corners of each intersection is equal to $90\sqrt{2}$, in other words 127 $\mu$m.

Each control circuit fitted with its hybrided opto-electronic circuit is then cut out.

Then, the end of an optic fibre is inserted and stuck in each housing formed on this opto-electronic circuit, by the intersection of two slots, with an alignment precision better than 2 $\mu$m in relation to the underlying VCSEL. The diameter of the optic fibre is equal to 125 $\mu$m±1 $\mu$m.

Returning to FIGS. 1A to 1D, it should be pointed out that the housings formed have the same function as the guiding holes described in document (2): they are also used to guide the ends of the optic fibres.

However, these housings or alignment guides (without lateral walls) are very different to these holes and are also obtained in a very different manner, these holes generally resulting from etching of a substrate in gallium arsenide.

One can, obviously, form the housings of the opto-electronic component 2 before hybriding this component onto the control circuit 8 and one again obtains a precise alignment in relation to the active zones 6.

However, one then risks ending up with the disadvantages described above regarding the fragility of substrates in gallium arsenide.

FIGS. 2A to 2D schematically illustrate an embodiment of the invention, which is shown by FIGS. 1A to 1D.

In the case of component 39 of FIGS. 2A to 2D, the substrate 4, on the lower face of which one has built up an epitaxial layer 4a in which active zones 6 have been formed, is not transparent to the light intended to be emitted or detected by these active zones.

One then forms a hole 40 in the substrate 4, opposite each active zone 6, in such a way as to remove the residual substrate and thus prolong the housing corresponding to this active zone up to the lower face of the substrate 4, in other words up to the epitaxial layer 4a.

The size of this hole is greater than the diameter of the core of the corresponding optic fibre but less than the size of the corresponding housing.

The holes 40 may be formed before the slots. In this case, each hole is formed from the upper surface of the substrate 4 up to the epitaxial layer 4a.

In another embodiment, the slots are formed first, enabling the housings to be obtained then, at the bottom of each housing, a hole 40 is formed, up to the epitaxial layer 4a.

These holes 40 may be formed collectively, for example by engraving of the substrate 4, in a standard manner.

Figure 2A:
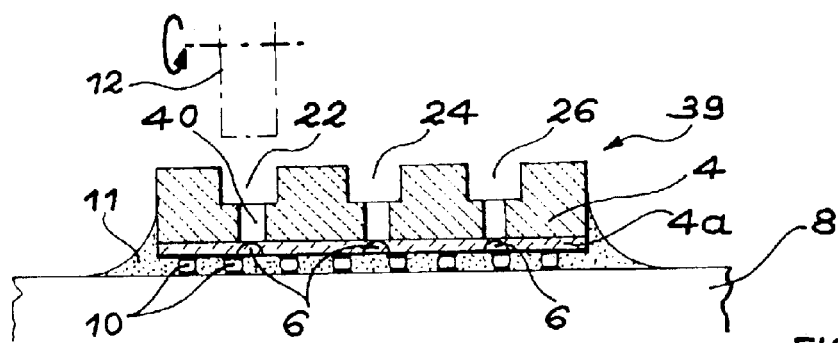
FIG. 2A is a schematic cross-sectional view of another specific embodiment of the device according to the invention during manufacture, using a substrate that is not transparent to the light emitted or captured by the optic fibres intended to be coupled to this device.
Figure 2B:
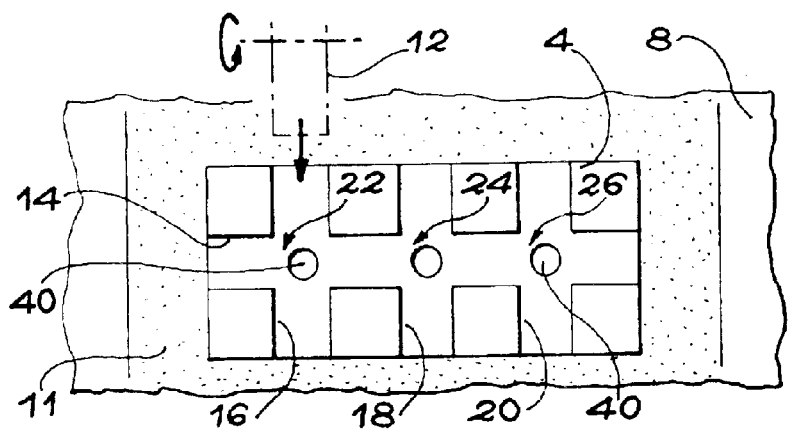
FIG. 2B is a schematic top view of the device in FIG. 2A.
Figure 2C:
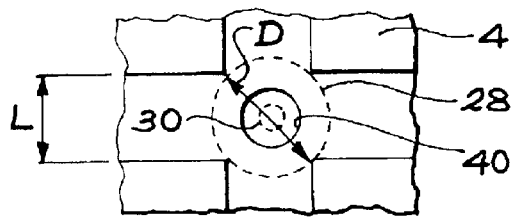
FIG. 2C is a magnified schematic top view of part of the device in FIG. 2A, showing a housing that has been formed in the substrate.
Figure 2D:
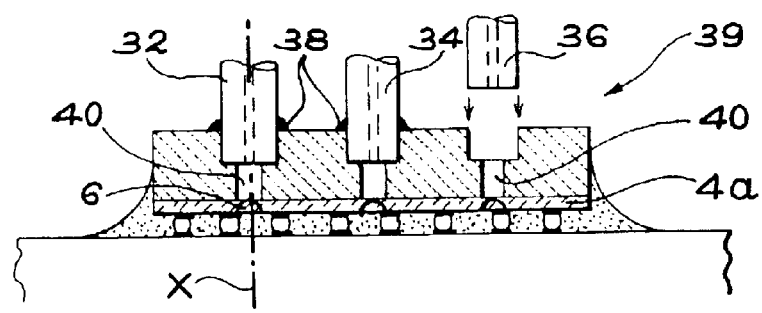
FIG. 2D is a schematic cross-sectional view of the device in FIG. 2A, in which the optic fibres are coupled to the active zones contained in the device.

Referring to FIG. 2C, it should be noted that the holes do not have to be formed with precision as regards their diameter because the alignment of each optic fibre on the four corners of the corresponding housing is always allowed by the slots.

Figure 3A:
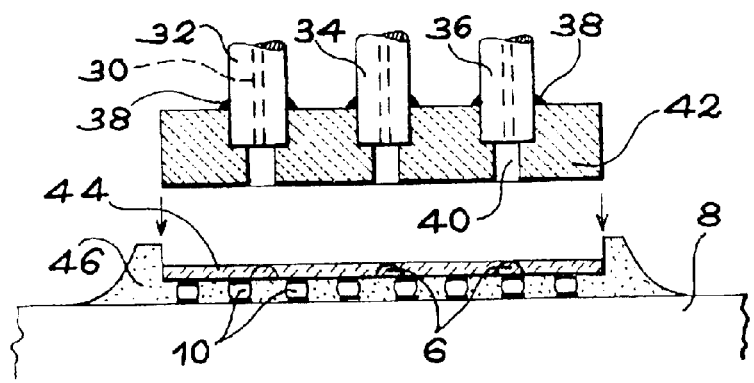
FIG. 3A is a schematic cross-sectional view of an intermediate alignment support, fitted with optic fibres, and an opto-electronic component, that one wishes to connect to each other.

In the example in FIG. 3A, a substrate forming an intermediate alignment support 42, fitted with optic fibres, for example the three fibres 32, 34 and 36, is intended to be aligned with an opto-electronic component 44 hybrided onto a control circuit 8, for example in silicon.

This opto-electronic component 44 comprises active zones 6 forming, for example, VCSEL. It is hybrided to the control circuit 8 by micro solder balls 10.

A resin 46 surrounds the opto-electronic component as can be seen in FIG. 2A and thus stretches out into the space between the lower face of the opto-electronic component 44 and the control circuit 8, around the micro solder balls 10.

Moreover, this resin stretches beyond the upper surface of the opto-electronic component 44 and thus defines, with this upper face, a space intended to receive the intermediate alignment support 42.

As regards such a structure (formed by the control circuit 8, the opto-electronic component 44 and the resin 46), one should refer to document (3).

In the example in FIGS. 3A to 3D, the present invention is applied to the manufacture of the intermediate alignment support 42.

Figure 3B:
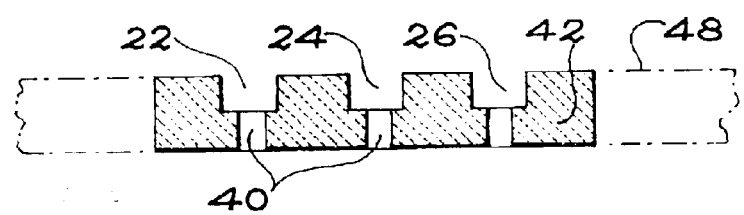
FIG. 3B is a schematic cross-sectional view of this intermediate alignment support during manufacture in accordance with the invention.

This intermediate alignment support 42, before the insertion of the ends of the optic fibres into it, may be seen in FIG. 3B.

This support 42 is treated in the same way as the substrate 4 in FIGS. 2A, 2B and 2C, in order to form (see FIGS. 3B and 3C) the slots 14, 16, 18 and 20 and holes 40 and thus define the housings, or alignment guides, 22, 24 and 26 for the ends of the fibres, prolonged by the holes 40 (with a diameter less than the size of the housings but greater that the diameter of the cores of the fibres), these holes 40 opening into the upper face of the support so that the light can go from an active zone to the corresponding fibre core and/or vice versa.

Preferably, one forms the holes 40 of the support 42 from one face to the other face of this support, for example using a laser with sufficient power, with a precision that is not very restrictive, and one then forms the slots in a precise manner, on the alignment support, in order to obtain the housings.

Then, the ends of the support 42 are cut in a precise and complete manner, so as to insert it in the space demarcated by the resin 46 and the opto-electronic component 44.

Figure 3C:
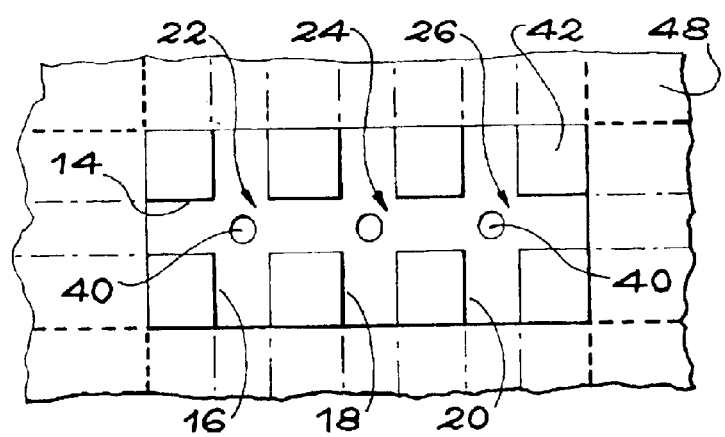
FIG. 3C is a schematic top view of the intermediate alignment support in FIG. 3B.
Figure 3D:
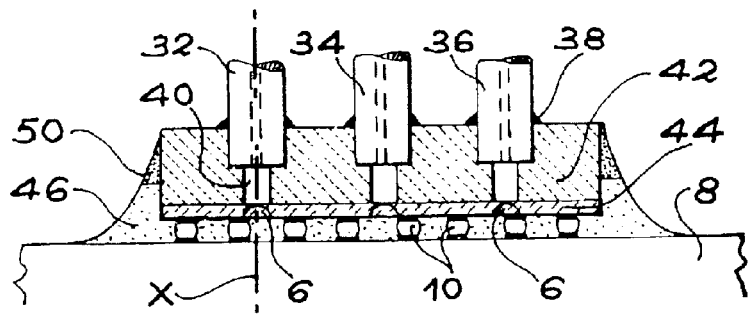
FIG. 3D is a schematic cross-sectional view of the intermediate alignment support and the opto-electronic component in FIG. 3A, once they have been connected to each other.

It should be pointed out that a large number of copies of the support 42 are generally formed, from a single sheet 48, for example in silicon (FIGS. 3B and 3C). One may then collectively form the holes and the slots on this sheet and then cut all of the copies.

The method schematically illustrated in FIGS. 3A to 3C requires great precision for the formation of the slots and for the cutting of the edges of the support 42, in relation to the housings intended to receive the ends of the fibres, so that the core of each fibre end can be aligned in a precise manner with the corresponding active zone 6.

The operations of forming the slots and cutting the edges of the support are carried out in series on the same machine and thus easily meet this requirement for precision.

When the intermediate alignment support is formed and thus comprises the housings 22, 24 and 26 and the holes 40, the ends of the optic fibres may be inserted into the housings and the optic fibres immobilised using an adhesive 38.

The intermediate alignment support 42, fitted with optic fibres, may then be inserted into the space mentioned above and this support immobilised in relation to the opto-electronic component 44 by means of an adhesive 50 (stretching from the periphery of the support 42 to the resin 46 in the example shown).

In another embodiment, one begins by positioning the intermediate support 42 in this space, then it is immobilised in relation to the opto-electronic component by means of the adhesive 50, then the ends of the optic fibres are inserted into the corresponding housings and the fibres are immobilised by means of the adhesive 38.

By way of indication and in nowise limitative, 1000 auxiliary alignment supports are formed from one silicon sheet; the holes 40 are formed by boring of the sheet using a laser; the slots are formed using rough alignments in relation to the borings obtained by laser; every eleventh slot, the sheet is completely cut in order to demarcate the edges of the auxiliary support; the auxiliary supports are transferred into the spaces, or imprints, provided on the control circuit on which 1000 opto-electronic components comprising respectively these spaces or imprints have been hybrided; the ends of the optic fibres are inserted and fixed in the housings of the auxiliary alignment supports.

It should be noted that the support 42 may be formed with only the slots and thus without the holes 40 when it is transparent to the light issued from the fibres and/or the active zones.

We will now return to one of the applications of the invention, which was mentioned at the beginning of the present description. In order to optically pump the lasers, formed by the active zones of a first opto-electronic component, by other lasers, formed by the active zones of a second opto-electronic component, the second component just has to be coupled to the respective ends of the optic fibres, in the manner described and referring to FIGS. 1A, 1B or 1C, and coupling in the same manner, the first component to the other ends of the fibres, this first component not then being hybrided to any control circuit in order to be able to emit light by its forward face.

The present invention has various advantages concerning the solidity, the ease of formation of the slots with the required precision (generally ±1 µm) and the manufacturing cost.

As regards the solidity, the opto-electronic component is preferably hybrided onto the control circuit before the formation of the slots.

The assembly formed in this manner enables the component to have high solidity during this slot formation stage and to avoid any problem of breaking, which occurs with standard built up substrates, for example in gallium arsenide or indium phosphide.

As regards the facility of forming the slots, the cutting of accurate sides in the gallium arsenide may be controlled perfectly, unlike the manufacture of fibre guiding holes in such a material, by chemical engraving or plasma engraving.

As regards the cost, the known techniques for manufacturing fibre guides all use photolithographic methods, which are extremely costly in terms of machines and time. They require, in fact, three successive operations, in particular a very long deep engraving operation.

The present invention allows, on the other hand, rapid manufacture of optic fibre guides, with a simple cutting machine.

Moreover, the formation of holes in the substrate does not need precision and may be carried out by laser, which is not expensive.

What is claimed is:

1. Method for passively aligning at least one component and at least one optic fibre, wherein the component comprises a substrate that has first and second opposite faces, this method being characterised in that:

at least two slots (14, 16, 18, 20) are formed in the substrate (4, 42), starting from the first face of this substrate, where these two slots form a cross and define, at their intersection, a housing (22, 24, 26) that is provided to receive one end of the optic fibre (32, 34, 36), and this end is placed in the housing.

2. Method according to claim 1, in which the component is an opto-electronic component (2, 39) comprising at least one active zone (6) formed on the side of the second face of the substrate, where this active zone is intended to emit or collect light and must be optically coupled to the optic fibre, and slots are formed in such a way that the housing is positioned opposite the active zone of the opto-electronic component.

3. Method according to claim 2, in which the active zone (6) forms a vertical cavity surface emitting laser.

4. Method according to claim 1, in which the component is an auxiliary alignment support for optic fibre(s) (42).

5. Method according to claim 4, in which this auxiliary alignment support (42) is coupled to an opto-electronic component (44) comprising at least one active zone (62), wherein the housing of the auxiliary alignment support is formed in such a way as to be positioned opposite this active zone when the auxiliary alignment support is coupled to the opto-electronic component.

6. Method according to claim 1, in which several copies of the component are formed on a same substrate (48), then the slots for all of these copies are formed, and then these copies are separated from each other.

7. Method according to claim 2, in which several copies of the opto-electronic component (2, 39) are formed on a same substrate, then the slots for all of these copies are formed, these copies are separated from each other, they are hybrided, on the side of their second faces, to an electronic control circuit (8) and the respective ends of the optic fibres (32, 34, 36) are placed in the housings formed on the copies, where these copies are provided to receive these ends.

8. Method according to claim 2, in which several copies of the optic-electronic component (2, 39) are formed on a same substrate, these copies are separated from each other, they are hybrided, on the side of their second faces, to an electronic control circuit (8), then slots are formed for all of the copies thus hybrided and the respective ends of the optic fibres (32, 34 36) are placed in the housings formed on the copies, where these copies are provided to receive these ends.

9. Method according to claim 1, in which the substrate is transparent to the light intended to be captured or emitted by the optic fibre.

10. Method according to claim 1, in which the substrate is opaque to the light intended to be captured or emitted by the optic fibre and, in addition, a hole (40), provided to prolong the housing (22, 24, 26) up to the second face of the substrate (4, 42) is formed.

11. Method according to claim 10, in which the hole (40) is formed using a laser.

12. Method according to claim 1, in which slots are formed using a cutting machine comprising a circular saw (12).

13. Device for passively aligning at least one component and at least one optic fibre, the component comprising a substrate that has first and second opposite faces, wherein this device is characterised in that it comprises at least two slots (14, 18, 18, 20) formed in the substrate (4, 42) from the first face of the substrate, and these two slots from a cross and define, by their intersection, a housing (22, 24, 26), which is provided to receive one end of the optic fibre (32, 34, 36).

14. Device according to claim 13, in which the component is an opto-electronic component (2, 39) that is hybrided, on the side of the second face of the substrate, to an electronic control circuit (8).

* * * * *